United States Patent [19]

Simmonds

[11] Patent Number: 5,164,142

[45] Date of Patent: Nov. 17, 1992

[54] STEPMOLDING PROCESS AND APPARATUS

[75] Inventor: Leonard B. Simmonds, Winter Springs, Fla.

[73] Assignee: Westinghouse Electric Corp., Pittsburgh, Pa.

[21] Appl. No.: 763,005

[22] Filed: Sep. 20, 1991

[51] Int. Cl.⁵ .............................................. B29C 43/26
[52] U.S. Cl. ..................................... 264/294; 264/347; 264/348; 425/505; 425/509; 425/446; 425/384
[58] Field of Search .............. 264/165, 294, 120, 324, 264/236, 348, 347, 280, 272.13, 272.19; 425/445, 446, 501, 502, 505, 509, 384

[56] References Cited

U.S. PATENT DOCUMENTS

| | | | |
|---|---|---|---|
| 2,300,760 | 11/1942 | Amigo | 264/296 |
| 2,682,292 | 6/1954 | Nagin | 425/502 |
| 3,041,660 | 7/1962 | Fink | 264/257 |
| 3,071,805 | 1/1963 | Merkle | 264/280 |
| 3,529,050 | 9/1970 | Smith | 264/137 |
| 3,661,491 | 5/1972 | Troyer | 425/501 |
| 4,161,383 | 7/1979 | Gadani | 425/384 |
| 5,043,128 | 8/1991 | Umeda | 264/324 |

Primary Examiner—Jeffery Thurlow
Attorney, Agent, or Firm—Michael G. Panian

[57] ABSTRACT

A process and apparatus are disclosed for step-molding elongated work pieces, such as generator components. A heated press includes a cooling box attached thereto, separated by a thermal insulating gasket. As a first portion of the work piece is being heat cured, a second portion extending adjacent the heated press is placed within the cooling box to prevent its being cured from residual heat of the press. After the first portion has been cured, the second portion is sequentially placed within the heated press. In this manner, the entire elongated work piece is cured and inadvertent "bumps" in the cured work piece are prevented to form the component to its desired shape.

6 Claims, 1 Drawing Sheet

STEPMOLDING PROCESS AND APPARATUS

TECHNICAL FIELD

The invention relates to the pressing and curing of elongated work pieces, and more particularly to a process and apparatus for step-molding dynamo-electric machine components.

BACKGROUND OF THE INVENTION

In an exemplary dynamo-electric machine, such as a turbine-generator, it is desirable to form certain components as one piece. This is generally done for such parts as turn insulation, rotor channels, and slot cells. As a result, relatively sizable presses are required for molding these components. For example, rotor turn insulation is often formed in one piece on a press which is about forty feet (40 ft.) (12M) in length. Such long presses require large shop areas for work and storage, and the length of these machines entails a higher cost for maintenance and repair. Also, any design changes to the length or other characteristics of the part to be molded requires the manufacture of long tool sections, which are expensive to manufacture and inconvenient to store.

Another process, step-molding, would eliminate many of these difficulties, by enabling lengthy parts to be molded using a shorter press. In step-molding, adjacent portions of a continuous part are sequentially molded, or "stepped" along, to produce a single, long molded component. However, attempts to use a step-molding process to form these particular generator components have not been completely successful.

Generator turn insulation, rotor channels, and slot cells are typically formed with a heat-curable material being associated with the component. The work piece, which initially has a soft, pliable composition, is formed or molded by placing the component within a press, and then heated as pressure is applied to form the component into the desired shape. After the component has been "cured" in the press and allowed to cool, it is then ready for installation in the generator. When elongated work pieces are step-molded, in conventional presses, a bulge of material can be formed in a section of the component immediately adjacent the press. As the uncured part is pressed and heated, so as to cure the heat-curable material associated with the work piece, the pressure causes this bulge to form. Heat from the press is sufficient to cure this bulge of material into an inadvertent, permanent "bump" in the work piece. Once cured, this bump may not be entirely flattened out in subsequent step-mold pressings as the remainder of the component is placed in the press. This can result in an unsatisfactory, unevenly molded part.

It is therefore an object of the present invention to provide a step-molding process and apparatus which will prevent the inadvertent curing of material adjacent to the press, to hinder the formation of a permanent bump in generator components.

DISCLOSURE OF THE INVENTION

In accordance with an embodiment of the present invention, according to which, briefly stated, an apparatus for step-molding a work piece having a heat-curable material associated therewith comprises means for heating a first portion of the work piece so as to cure the heat-curable material of that portion. A second portion of the work piece extends adjacent to the heating means. Means for cooling the second portion of the work piece are provided to prevent curing of the heat-curable material of the second portion adjacent the heating means.

The work piece generally comprises elongated components for an electrical generator, such as turn insulation, rotor channels and slot cells.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENT

Figure 1:
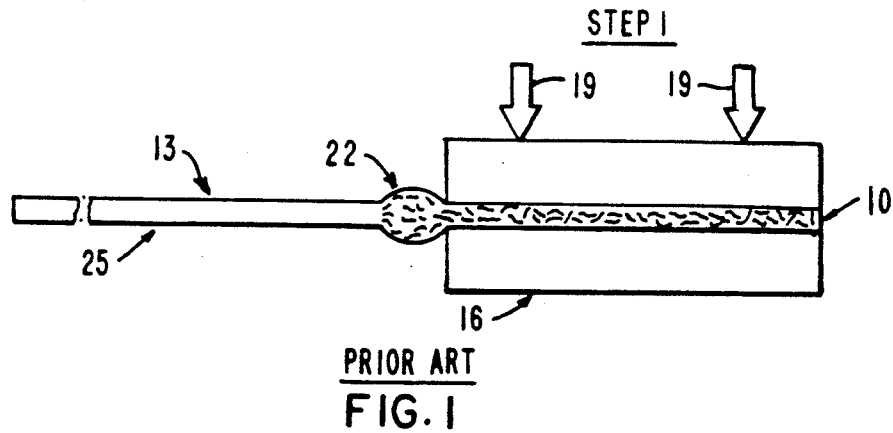
FIGS. 1 and 2 are representative of a prior art step-molding process.
Figure 2:
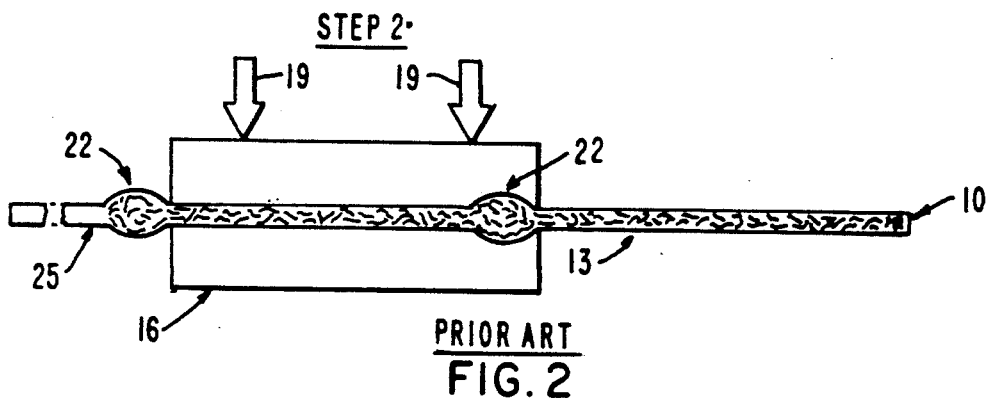

Referring now to the drawings in detail, wherein like numerals indicate similar elements throughout the drawings, FIGS. 1 and 2 show a conventional step-molding process. In step 1, a portion 10 of a work piece 13 is placed within a press 16. The work piece 13 comprises a heat curable material and may be, for example, a piece of generator rotor insulation that extends up to about 40 ft. (12M), or more, in length. As pressure is applied to the work piece 13, as indicated by arrows 19, the press 16 is heated according to techniques well known to those skilled in the art. This causes a heat-curable material associated with the work piece 13 to be cured. However, as the portion 10 of the work piece within the press 16 is being cured, a bulge 22 of material is formed on another portion 25 of the work piece 13 which is immediately adjacent the heated press 16. The residual heat from the press is sufficient to cure this bulge of material 22, and forms a permanent bump in the work piece 13. When this second portion 25 of the work piece is placed within the press 16 to cure in the second step, this bump 22 can become a permanent part of the work piece since the heat-curable material has already been cured and may not be entirely flattened out during this sequence. The "bump" shown in FIG. 2 is exaggerated to show its effect, but for certain dynamo-electric machine components, even a small bump is unsatisfactory.

Figure 3:
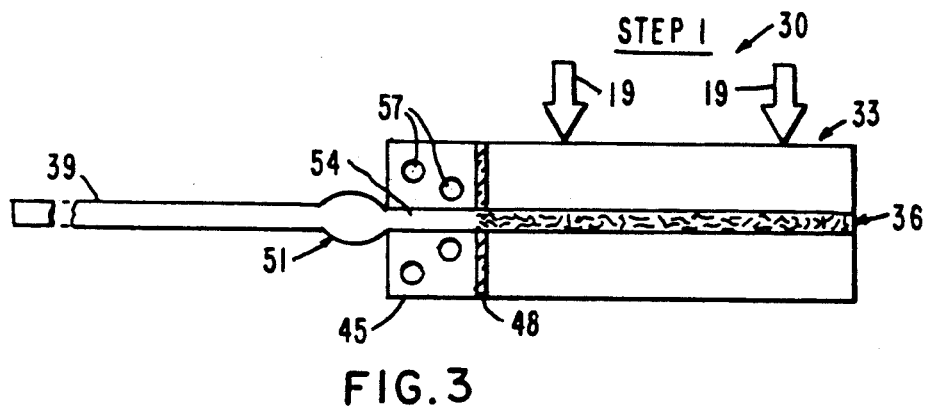
FIGS. 3 and 4 are representative of the step-molding process and apparatus according to the present invention.
Figure 4:
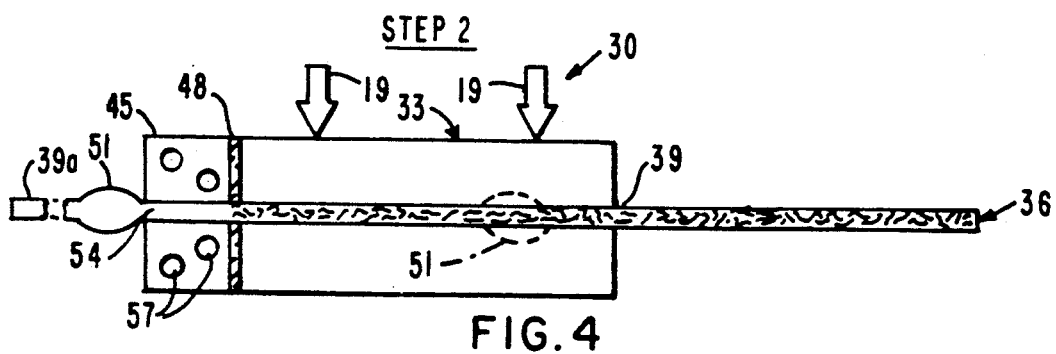

In order to prevent this unsatisfactory result when step molding long generator components, the process and apparatus of the present invention is utilized. As shown in FIGS. 3 and 4, the apparatus 30 of the present invention comprises means 33 for heating and pressing a first portion 36 of a work piece 39. The work piece contains a heat-curable material associated with it which is cured in, the press 33. The press 33 can be heated by techniques well known to those skilled in the art. One such method, for example, is to provide flow passages in the press for the circulation therethrough of a heated fluid for heating the press, and thus the material placed therein.

In order to prevent curing of a second portion 42 of the work piece 39 which extends in front of the heated press 33, means 45 are provided for cooling this second portion. Preferably, the cooling means comprises a water-cooled box 45 attached to the press 33 for conducting away extraneous heat form the heated press to keep the material immediately adjacent the press cool. An insulating material 48, such as a thermal gasket of Nomex ™ (poly-1,3-phenyleneisophthalamide) or other suitable material is provided for thermal shielding between the hot press 33 and the cooling box 45. In this manner, the heat-curable material associated with the second portion 42 of the work piece 39 is prevented from curing. The cooling box 45 also acts as an extension to the length of the press. This extension pushes the bulge 51 of material formed when pressure is applied to the work piece 39 even further away from the hot press surface. Thus the bulge 51 that is formed is not cured.

In order to step-mold elongated generator components, the following process is preferably followed. The pliable work piece 39, having a heat-curable material associated with it, is placed within the press 33, so that the first portion 36 is substantially between the halves of the press 33. A second portion 42 of the component extends adjacent to the press 33, such that at least a part 54 of the second portion is situated within the cooling box 45 attached to the press. The press is operated to place pressure on the first portion 36 of the work piece, as well as that part 54 of the second portion 39 in the cooling box 45. The press 33 is then heated so as to cure the heat-curable material of the first portion 36. Simultaneously, water, or other suitable coolant, is circulated through passages 57 in the cooling box to keep the second portion cool, such that it does not reach the temperature required to cure the heat-curable material. After the first portion 36 has been cured, the press 33 is re-opened, and at least a segment of the second portion 39 is placed within the press. This segment includes that part 54 that was within the cooling box 45, as well as the section immediately adjacent the cooling box which may include the bulge 51 of uncured material. When the uncured segment of the component is within the press 33, it is again operated, along with the cooling box, to cure that segment. When doing so, the bulge 51 is pressed flat since it is as yet uncured, and the segment is cured according to the desired shape necessary for the particular generator component being step-molded.

Depending upon the length of the press 33, including the cooling box 45, and the generator component 36 being step-molded at the time, more than two (2) curing steps may be necessary. That is, when the segment of the second portion is being cured, a further segment 39a of the second portion may still extend adjacent to the press 33. Therefore, the above steps are repeated until the entire component has been cured in sequence.

An alternative method for step-molding an elongated work piece, in order to reduce the time for curing of the component in the apparatus of the present invention, may proceed as follows. After the first portion of the component has been placed in the press, the press is heated while the extension is cooled. After sufficient time to cure the first portion, the heated press is cooled to expedite the return to ambient temperature. The work piece is then advanced to place at least a segment of the second portion within the press. This segment is then rapidly heated to a high temperature for a relatively short time, as above, to cure the segment. The press is then cooled and the work piece advanced. These steps are performed as many times as necessary to cure the complete work piece. As a final step, the component can then be post-cured in an oven to ensure that the piece is hardened in its desire shape. By rapidly heating the portions to high temperature for a short time, and then cooling the heated portion, to initially cure the work piece the time required for the numerous cure steps is reduced. This methodology thus leaves the apparatus of the present invention available for the step-molding of another component.

There are several advantages to the present invention over conventional molding techniques for elongated components. One is that a single molding apparatus for any type of work piece or component to be step-molded is needed. Separate dies or mold forms can be used within the press, depending upon the desired shape of that particular component which is to be cured. Since the apparatus is of a compact size, manufacture and storage of these numerous dies become practical. Moreover, repair and re-tooling for design changes are easier to accomplish for shorter molds than longer devices. Furthermore, the peripheral requirements of the press, such as the resources needed for heating the press, are accordingly reduced in scope. Additionally, the amount of shop space required for the apparatus is significantly reduced.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. Apparatus for molding a dynamo-electric machine component having a heat-curable material associated therewith, the molding apparatus comprising:
   means for heating and pressing a first portion of the component above a predetermined temperature so as to cure the heat-curable material, said heating and pressing means being of a length less than that of the component such that a second portion of the component extends adjacent to said heating means;
   means for cooling and pressing at least a part of the second portion of the component such that the part is maintained at a temperature less than the predetermined temperature so as to prevent curing of the heat-curable material adjacent said heating means; and
   insulating means disposed between said heating means and said cooling means.

2. A method of molding a dynamo-electric machine component having a heat-curable material associated therewith, said method comprising the steps of:
   a. providing a press having means for heating the press on one end thereof and means for cooling the press on an opposite end, said press having a predetermined shape;
   b. placing a first portion of the component within the one end of the press, such that a second portion of the component extends adjacent the one end and into the opposite end;
   c. causing the press to apply pressure to said first and second portions within the press; and
   d. heating the one end of the press to a predetermined temperature to cure the first portion of the component, while cooling the opposite end of the press to maintain the second portion at a temperature less than the predetermined temperature to prevent curing of the second portion.

3. The method of claim 2, further comprising the steps of:

e. relieving the pressure on said first and second portions of the component within the press;

f. advancing the component within the press such that at least a segment of the second portion is placed within the one end of the press; and g. repeating steps c and d to cure the segment of the second portion.

4. The method of claim 3, wherein the steps are repeated until the entire component has been cured.

5. The method of claim 2, further comprising the step of cooling the first portion of the component after it has been cured;

e. relieving the pressure on said first and second portions of the component within the press;

f. advancing the component within the press such that at least a segment of the second portion is placed within the one end of the press; and g. repeating steps c and d to cure the segment of the second portion.

6. The method of claim 5, further comprising repeating steps b through g until the entire component has been cured.

* * * * *